United States Patent
Nandigama et al.

(10) Patent No.: US 10,393,609 B2
(45) Date of Patent: Aug. 27, 2019

(54) SYSTEM AND METHOD FOR DETECTION OF CHANGES TO COMPRESSION RATIO AND PEAK FIRING PRESSURE OF AN ENGINE

(71) Applicant: AI ALPINE US BIDCO INC., Wilmington, DE (US)

(72) Inventors: Pavan Chakravarthy Nandigama, Bangalore (IN); Sujith Mohan, Bangalore (IN); Amit Shrivastava, Bangalore (IN); Chandan Kumar, Hyderabad (IN); Jeffrey Jacob Bizub, Milwaukee, WI (US)

(73) Assignee: AI ALPINE US BIDCO INC., Wilmington, DE (US)

( * ) Notice: Subject to any disclaimer, the term of this patent is extended or adjusted under 35 U.S.C. 154(b) by 334 days.

(21) Appl. No.: 14/790,785

(22) Filed: Jul. 2, 2015

(65) Prior Publication Data
US 2017/0003190 A1    Jan. 5, 2017

(51) Int. Cl.
*F02B 1/12*    (2006.01)
*F02D 35/02*   (2006.01)
(Continued)

(52) U.S. Cl.
CPC .............. *G01L 23/221* (2013.01); *F02B 1/12* (2013.01); *F02D 35/023* (2013.01);
(Continued)

(58) Field of Classification Search
CPC ... G01L 23/221; F02D 35/023; F02D 35/024; F02D 35/027; F02D 35/028; G01M 15/12
See application file for complete search history.

(56) References Cited

U.S. PATENT DOCUMENTS 4,063,538 A * 12/1977 Powell ................ F02P 5/1455
                                              123/406.42
4,606,312 A *  8/1986 Nakano ................ G01L 23/18
                                              123/198 DB
(Continued)

FOREIGN PATENT DOCUMENTS

CN    203480037         3/2014
DE    10233612 A1       2/2004
(Continued)

OTHER PUBLICATIONS

International Search Report and Written Opinion issued in connection with corresponding Application No. PCT/US2016/039716 dated Oct. 28, 2016.
(Continued)

*Primary Examiner* — Justin Seo
*Assistant Examiner* — John M Royston
(74) *Attorney, Agent, or Firm* — Fletcher Yoder, P.C.

(57) ABSTRACT

A system includes a cylinder, a piston, a sensor configured to detect vibrations of the cylinder, piston, or both that correspond with varying pressures within the cylinder, and a controller coupled to the sensor. The controller is configured to receive a first signal from the sensor corresponding with first vibrations of the cylinder and to deduce from the first signal a first operating value of a parameter indicative of peak firing pressure at a first time, to compare the first operating value with a baseline value of the parameter indicative of peak firing pressure to detect a change in peak firing pressure, to receive a second signal from the sensor corresponding with second vibrations of the cylinder and to deduce from the second signal a second operating value of the parameter indicative of peak firing pressure at a second time, and to compare the second operating value with the baseline value to confirm the change in peak firing pressure.

20 Claims, 6 Drawing Sheets

(51) Int. Cl.
*F02D 41/22* (2006.01)
*G01L 23/22* (2006.01)
*G01M 15/12* (2006.01)

(52) U.S. Cl.
CPC ......... *F02D 35/024* (2013.01); *F02D 35/027* (2013.01); *G01M 15/12* (2013.01); *F02D 35/028* (2013.01); *F02D 41/22* (2013.01); *F02D 2200/025* (2013.01)

(56) References Cited

U.S. PATENT DOCUMENTS

| | | |
|---|---|---|
| 5,029,565 A | 7/1991 | Talbot |
| 5,111,790 A | 5/1992 | Grandy |
| 5,115,778 A | 5/1992 | Holroyd |
| 5,119,783 A | 6/1992 | Komurasski |
| 5,241,480 A | 8/1993 | Takaku et al. |
| 5,257,533 A | 11/1993 | Imada |
| 5,337,240 A | 8/1994 | Nakagawa et al. |
| 5,339,245 A | 8/1994 | Hirata et al. |
| 5,361,213 A | 11/1994 | Fujieda et al. |
| 5,392,642 A | 2/1995 | Tao |
| 5,400,648 A | 3/1995 | Mahr |
| 5,452,699 A | 9/1995 | Rossignol |
| 5,467,638 A | 11/1995 | Philipp |
| 5,594,649 A | 1/1997 | Cook et al. |
| 5,693,936 A | 12/1997 | Komachiya et al. |
| 5,763,769 A | 6/1998 | Kluzner |
| 5,837,887 A | 11/1998 | Shibata et al. |
| 5,905,193 A | 5/1999 | Hashizurne et al. |
| 5,932,801 A | 8/1999 | Akishita et al. |
| 5,934,256 A | 8/1999 | Werizlawski et al. |
| 5,996,398 A | 12/1999 | Schleupen et al. |
| 6,104,195 A | 8/2000 | Yoshinaga et al. |
| 6,273,064 B1 | 8/2001 | Scholl et al. |
| 6,276,334 B1 | 8/2001 | Flynn et al. |
| 6,330,877 B1 | 12/2001 | Nordin |
| 6,336,355 B1 | 1/2002 | Sasaki et al. |
| 6,550,311 B2 | 4/2003 | Sloboda |
| 6,598,468 B2 | 7/2003 | Zur Loye et al. |
| 6,662,781 B1 | 12/2003 | Tomo et al. |
| 6,814,054 B2 | 11/2004 | Sauler et al. |
| 6,862,517 B2 | 3/2005 | Galtier |
| 6,885,932 B2 | 4/2005 | Liu et al. |
| 6,912,460 B2 | 6/2005 | Sauler et al. |
| 6,947,829 B2 | 9/2005 | Honda |
| 6,978,771 B2 | 12/2005 | Kuzuyama et al. |
| 6,990,947 B2 | 1/2006 | Kuzuyama et al. |
| 7,021,128 B2 | 4/2006 | Rauchfuss et al. |
| 7,027,909 B2 | 4/2006 | deBotton et al. |
| 7,181,338 B2 | 2/2007 | Takemura et al. |
| 7,191,658 B2 | 3/2007 | Oda et al. |
| 7,212,909 B2 | 5/2007 | Yoshino et al. |
| 7,243,529 B2 | 7/2007 | Takemura et al. |
| 7,246,600 B2 | 7/2007 | Nakashima et al. |
| 7,260,469 B2 | 8/2007 | Birk et al. |
| 7,263,872 B2 | 9/2007 | Danet et al. |
| 7,310,993 B2 | 12/2007 | Popielas et al. |
| 7,325,529 B2 | 2/2008 | Ancimer et al. |
| 7,356,404 B2 | 4/2008 | Takemura et al. |
| 7,376,506 B2 | 5/2008 | Schueler |
| 7,383,816 B2 | 6/2008 | Zurlo |
| 7,444,231 B2 | 10/2008 | Ancimer et al. |
| 7,444,236 B2 | 10/2008 | Wiles |
| 7,448,254 B2 | 11/2008 | Kurtz et al. |
| 7,546,198 B2 | 6/2009 | Remelman |
| 7,559,230 B2 | 7/2009 | Zimmer |
| 7,571,640 B2 | 8/2009 | Andrews |
| 7,628,253 B2 | 12/2009 | Jin et al. |
| 7,669,582 B2 | 3/2010 | Huang |
| 7,712,450 B2 | 5/2010 | Sato et al. |
| 7,747,380 B2 | 6/2010 | Chauvin et al. |
| 7,810,469 B2 | 10/2010 | Vigild et al. |
| 7,823,561 B2 | 11/2010 | Omuro et al. |
| 8,000,884 B2 | 8/2011 | Aso et al. |
| 8,032,293 B2 | 10/2011 | Binder et al. |
| 8,069,972 B2 | 11/2011 | Auclair et al. |
| 8,078,389 B2 | 12/2011 | Huang et al. |
| 8,079,261 B2 | 12/2011 | Crickmore et al. |
| 8,108,131 B2 | 1/2012 | Huang et al. |
| 8,155,857 B2 | 4/2012 | Loeffler et al. |
| 8,250,905 B2 | 4/2012 | Schneider et al. |
| 8,260,531 B2 | 9/2012 | Yasuda |
| 8,316,824 B2 | 11/2012 | Hagari et al. |
| 8,342,011 B2 | 1/2013 | Galtier et al. |
| 8,359,909 B2 | 1/2013 | Duval et al. |
| 8,396,649 B2 | 3/2013 | Huang |
| 8,463,533 B2 | 6/2013 | Glugla et al. |
| 8,499,623 B2 | 8/2013 | Duval et al. |
| 8,528,521 B2 | 9/2013 | Landsmann et al. |
| 8,538,666 B2 | 9/2013 | Buslepp et al. |
| 8,606,484 B2 | 12/2013 | Ohata |
| 8,627,800 B2 | 1/2014 | Glugla et al. |
| 8,639,432 B2 | 1/2014 | Matsuo et al. |
| 8,680,707 B2 | 3/2014 | Childs et al. |
| 8,677,975 B2 | 8/2014 | Muhammad et al. |
| 8,849,471 B2 | 9/2014 | Daniel et al. |
| 2003/0188714 A1* | 10/2003 | Yamamoto ............ F02D 35/023 73/114.09 |
| 2006/0064226 A1 | 3/2006 | Damitz et al. |
| 2006/0225707 A1* | 10/2006 | Eser .................... F02D 41/3863 123/458 |
| 2011/0246044 A1* | 10/2011 | Buslepp ................ F02D 35/023 701/101 |
| 2015/0032400 A1* | 1/2015 | Quetant ............ B60H 1/00978 702/100 |
| 2015/0120167 A1* | 4/2015 | Perless ................... F02D 41/22 701/102 |
| 2015/0285710 A1* | 10/2015 | Akazaki ................ G01M 15/08 73/114.16 |

FOREIGN PATENT DOCUMENTS

| | | |
|---|---|---|
| EP | 1447654 | 8/2004 |
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| WO | WO2008000568 | 1/2008 |
| WO | WO2008059376 | 5/2008 |
| WO | WO2009106557 | 9/2009 |
| WO | 2009122012 A1 | 10/2009 |
| WO | WO2013015372 | 1/2013 |
| WO | WO2013026950 | 2/2013 |
| WO | WO2013118151 | 8/2013 |

OTHER PUBLICATIONS

U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 8, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jerry Jacob Bizub.
U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.

(56) References Cited

OTHER PUBLICATIONS

U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Matuthi Narasinga Rao Devarakonda.
U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
Reduction Piston Excitation by Optimizing Piston Profiles; Takayuki Koizumi et al,; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tijima J.; available online; www.researchgate.net, May 2012.
Bolt loosening detection using vibration characteristics of thin plate with piezoelectric elements; Takeshi Nakahara et al; Proc.of SPIE 5391, Smart Struc. & Materials, Jul. 2004.

\* cited by examiner

SYSTEM AND METHOD FOR DETECTION OF CHANGES TO COMPRESSION RATIO AND PEAK FIRING PRESSURE OF AN ENGINE

BACKGROUND

The subject matter disclosed herein relates to reciprocating engines and, more specifically, to monitoring and control of parameters of the engine Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into a combustion chamber of the cylinder, while a fuel injector may inject fuel into the combustion chamber of the cylinder. The fuel and air then mix and combust in the combustion chamber to generate combustion fluids, e.g., hot gases, which may then be directed to exit the combustion chamber of the cylinder via an exhaust valve. Accordingly, the carbonaceous fuel is transformed into mechanical motion, useful in driving a load. For example, the load may be a generator that produces electric power.

In order to control efficiency and/or performance of the engine, the fuel-air mixture is ignited when the piston is at a particular location in the cylinder. Unfortunately, ignition or timing of the ignition of the fuel-air mixture may become inaccurate over time. Inaccurate ignition may result in a change (e.g., a rise or fall) in peak firing pressure, thereby reducing an efficiency and/or performance of the engine. Likewise, an increase in compression ratio and/or peak firing pressure may cause detonation (e.g., pre-ignition, knocking, or pinging) of the fuel-air mixture in the combustion chamber, which also reduces an efficiency and/or performance of the engine. Accordingly, it may be beneficial to improve detection of ignition processes in reciprocating engines.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a reciprocating engine system includes a cylinder, a piston disposed within the cylinder, a sensor disposed proximate to the cylinder and configured to detect vibrations of the cylinder, piston, or both that correspond with varying pressures within the cylinder, and a controller communicatively coupled to the sensor. The controller is configured to receive a first signal from the sensor corresponding with first vibrations of the cylinder and to deduce from the first signal a first operating value of a parameter indicative of peak firing pressure at a first time, to compare the first operating value with a baseline value of the parameter indicative of peak firing pressure to detect a change in peak firing pressure, to receive a second signal from the sensor corresponding with second vibrations of the cylinder and to deduce from the second signal a second operating value of the parameter indicative of peak firing pressure at a second time, and to compare the second operating value with the baseline value to confirm the change in peak firing pressure.

In a second embodiment, a method includes detecting, via knock sensors, first vibrational profiles of corresponding cylinders of a reciprocating engine over a first combustion cycle, and a second vibrational profiles of the corresponding over a second combustion cycle, wherein the first and second vibrational profiles are indicative of corresponding first and second pressures within the corresponding cylinders over the first and second combustion cycles, respectively. The method also includes receiving, via a controller, first signals and second signals from the knock sensors that correspond with the first and second vibrational profiles, respectively. The method also includes determining, via the controller, first operating values of a parameter indicative of peak firing pressure from the first signals, and second operating values of the parameter indicative of peak firing pressure from the second signals. Further, the method includes comparing, via the controller, the first operating values with a baseline value of the parameter indicative of peak firing pressure to determine a change in peak firing pressure in one or more cylinders of the corresponding cylinders. Further still, the method includes comparing, via the controller, the second operating values with the baseline value of the parameter indicative of peak firing pressure to confirm the change in peak firing pressure in the one or more cylinders of the corresponding cylinders.

In a third embodiment, a non-transitory computer readable medium comprising executable instructions that, when executed, cause a processor to: receive, from a knock sensor, a first signal indicative of first vibrations within a cylinder that correspond with a first range of pressures within the cylinder, receive, via the knock sensor, a second signal indicative of second vibrations within the cylinder that correspond with a second range of pressures within the cylinder, and deduce a first value of a parameter indicative of peak firing pressure from the first signal and a second value of the parameter indicative of peak firing pressure from the second signal. Further, the instructions, when executed, cause the processor to compare the second value with the first value to detect a rise in peak firing pressure.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
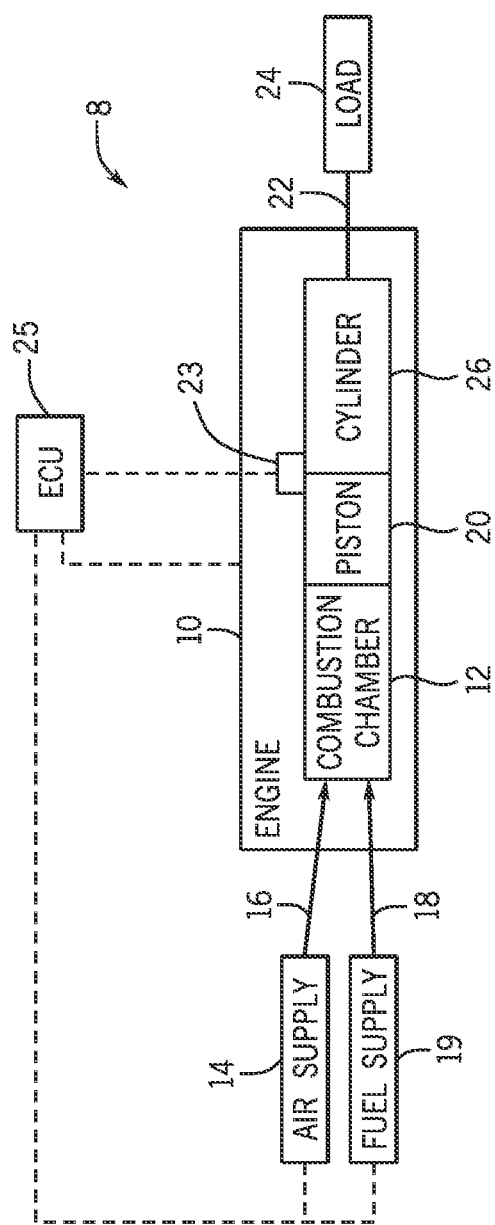
FIG. 1 is a block diagram of an embodiment of a reciprocating engine, in accordance with an aspect of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to reciprocating engines and, more specifically, to detection of changes (e.g., increase or decreases) in compression ratio and/or peak firing pressure using a sensor, such as a knock sensor, and a controller. For example, the reciprocating engine, which will be described in detail below with reference to the figures, includes a cylinder and a piston disposed within the cylinder (or multiple cylinders, each having a corresponding piston disposed within the cylinder). The reciprocating engine includes an internal combustion engine, such as a spark ignition engine or compression-ignition engine (e.g., a diesel engine) The reciprocating engine includes an ignition feature that ignites a fuel-oxidant (e.g., fuel-air) mixture within a combustion chamber proximate to the piston (e.g., within the cylinder and above the piston). The hot combustion gases generated from ignition of the fuel-air mixture drive the piston within the cylinder. In particular, the hot combustion gases expand and exert a pressure against the piston that linearly moves the position of the piston from a top portion to a bottom portion of the cylinder during an expansion stroke. The piston converts the pressure exerted by the hot combustion gases (and the piston's linear motion) into a rotating motion (e.g., via a connecting rod coupled to, and extending between, the piston and a crankshaft) that drives one or more loads, e.g., an electrical generator.

Generally, the reciprocating engine includes an ignition feature or mechanism (e.g., a spark plug) that ignites the fuel-air mixture within the combustion chamber as the piston moves upwardly toward the top portion of the cylinder. For example, the spark plug may ignite the fuel-air mixture when the crank angle of the crankshaft is approximately 5-35 degrees from top dead center (TDC), where TDC is a "highest" position of the piston within the cylinder. Improved timing of the ignition may improve performance of the reciprocating engine. For example, poor timing of the ignition may cause pre-ignition (e.g., engine knocking, pinging), which describes a condition in which pockets of the fuel-air mixture combust outside an envelope of a primary combustion front. Pre-ignition may significantly reduce recovery of work (e.g., by the piston) from the expanding combustion gases.

Thus, in accordance with the present disclosure, a knock sensor (or other sensor suitable for measuring vibration and/or acoustics) is included in, or proximate to, each cylinder of the reciprocating engine and may be communicatively coupled to a controller. As used herein, the term knock sensor may include any suitable vibration sensor, acoustic sensor, or other sensor, or a combination thereof, which may or may not be used to detect knock in the engine. Furthermore, any discussion of vibration or sensor measurements, data analysis, determination of engine parameters (e.g., peak firing pressure and compression ratio), and associated controls is also intended to cover the same using acoustics sensor measurements, and vice versa. The knock sensor detects, for example, vibrations of the cylinder corresponding with varying pressures within the cylinder, and the controller converts a vibrational (e.g., sound) profile of the cylinder, provided via a signal by the knock sensor, into useful parameters for determining combustion conditions (e.g., pressure conditions) in the cylinder. For example, the knock sensor detects vibrations in, or proximate to, the cylinder, and communicates the signal indicative of the vibrational profile (e.g., graph) to the controller. The controller converts the signal indicative of the vibrational profile to a parameter indicative of pressure within the cylinder. Further, peak firing pressure may be deduced from the signal, where peak firing pressure describes a maximum pressure exerted by the expanding combustion gases on the piston during each expansion stroke. The parameter indicative of pressure within the cylinder (e.g., peak firing pressure) may be a position of the piston within the cylinder (e.g., measured in crank angles at, for example, the time of ignition), a speed (e.g., maximum speed) of the piston within the cylinder, an acceleration (e.g., maximum acceleration) of the piston within the cylinder, or a pressure (e.g., maximum pressure or peak firing pressure) within the cylinder. In other words, operating or actual peak firing pressure may be determined from any one of these parameters (e.g., position, speed, acceleration, or pressure).

Generally, a baseline peak firing pressure is determined for the reciprocating engine by the manufacturer before installation and operational use. To determine a baseline peak firing pressure, the engine system may be operated to peak firing pressure and data captured via the sensor(s) may be logged. The logged data may then be processed into one or more curves or graphs. For example, noise level as a function of time may be used as one of the curves, as well as noise frequency, noise phase, noise amplitude, and so on. Such curve(s) are then considered baseline curves representative of the peak firing pressure. It should be noted, however, that the curves may be determined without generating a visual representation (e.g., a graph) of each curve.

While in one embodiment the baseline peak firing pressure may be determined, e.g., in a factory before the reciprocating engine is installed for normal use, in another embodiment the baseline peak firing pressure may be determined in situ after delivery of the engine to the customer. The reciprocating engine may be operated to achieve baseline peak firing pressure during each expansion stroke. For example, an increase in operating peak firing pressure above the baseline peak firing pressure may result in engine knocking (e.g., local pockets of combustion outside the primary combustion front) that reduces an efficiency of the reciprocating engine, as the piston may be unable to efficiently recover work from the expanding combustion gases.

Accordingly, as previously described, the knock sensor transmits a signal indicative of vibration of the cylinder (or piston within the cylinder) to the controller, and the controller converts the signal into one or more of the parameters indicative of peak firing pressure (e.g., position, speed, acceleration, or pressure). The controller may determine an actual value (e.g., operating value) of the parameter indicative of peak firing pressure and compare the actual value with the value of the baseline peak firing pressure (or parameter indicative of peak firing pressure). For example, the controller may first determine the operating peak firing pressure from the parameter indicative of peak firing pressure, and may then compare the operating peak firing pressure with the baseline peak firing pressure. Alternatively, the controller may convert the baseline peak firing pressure into a baseline parameter indicative of peak firing pressure and compare the baseline parameter indicative of peak firing pressure with the actual parameter indicative of peak firing pressure. In either embodiment, the controller may determine if the operating peak firing pressure exceeds the baseline peak firing pressure by more than a predetermined cut-off factor (or threshold value). For example, the operating peak firing pressure of the cylinder may fluctuate slightly over time, so a cut-off factor may be introduced into the comparison to compensate for slight fluctuations in pressure. If the actual peak firing pressure exceeds the baseline peak firing pressure plus cut-off factor, the knock sensor may take another reading and transmit the reading to the controller, thereby enabling the controller to compare a second reading with the baseline peak firing pressure and cut-off factor to confirm the rise in peak firing pressure. Further, in some embodiments, the controller may compare the second reading with the first reading to determine if the peak firing pressure has increased even more since the first reading (e.g., by determining a rate of change or slope between readings). Other control logic may also be employed, and will be described in detail below with reference to the figures.

Turning to the drawings, FIG. 1 illustrates a block diagram of an embodiment of a portion of an engine driven power generation system 8. As described in detail below, the system 8 includes an engine 10 (e.g., a reciprocating internal combustion engine) having one or more combustion chambers 12 (e.g., 1, 2, 3, 4, 5, 6, 7, 8, 10, 12, 14, 16, 18, 20, or more combustion chambers 12). An air supply 14 is configured to provide a pressurized oxidant 16, such as air, oxygen, oxygen-enriched air, oxygen-reduced air, or any combination thereof, to each combustion chamber 12. The combustion chamber 12 is also configured to receive a fuel 18 (e.g., a liquid and/or gaseous fuel) from a fuel supply 19, and a fuel-air mixture ignites and combusts within each combustion chamber 12. The hot pressurized combustion gases cause a piston 20 adjacent to each combustion chamber 12 to move linearly within a cylinder 26 and convert pressure exerted by the gases into a rotating motion, which causes a shaft 22 to rotate. Further, the shaft 22 may be coupled to a load 24, which is powered via rotation of the shaft 22. For example, the load 24 may be any suitable device that may generate power via the rotational output of the system 10, such as an electrical generator. Additionally, although the following discussion refers to air as the oxidant 16, any suitable oxidant may be used with the disclosed embodiments. Similarly, the fuel 18 may be any suitable gaseous fuel, such as natural gas, associated petroleum gas, propane, biogas, sewage gas, landfill gas, coal mine gas, for example.

The system 8 disclosed herein may be adapted for use in stationary applications (e.g., in industrial power generating engines) or in mobile applications (e.g., in cars or aircraft). The engine 10 may be a two-stroke engine, three-stroke engine, four-stroke engine, five-stroke engine, or six-stroke engine. The engine 10 may also include any number of combustion chambers 12, pistons 20, and associated cylinders (e.g., 1-24). For example, in certain embodiments, the system 8 may include a large-scale industrial reciprocating engine having 4, 6, 8, 10, 16, 24 or more pistons 20 reciprocating in cylinders 26. In some such cases, the cylinders 26 and/or the pistons 20 may have a diameter of between approximately 13.5-34 centimeters (cm). In some embodiments, the cylinders and/or the pistons 20 may have a diameter of between approximately 10-40 cm, 15-25 cm, or about 15 cm. The system 10 may generate power ranging from 10 kW to 10 MW. In some embodiments, the engine 10 may operate at less than approximately 1800 revolutions per minute (RPM). In some embodiments, the engine 10 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 10 may operate between approximately 750-2000 RPM, 900-1800 RPM, or 1000-1600 RPM. In some embodiments, the engine 10 may operate at approximately 1800 RPM, 1500 RPM, 1200 RPM, 1000 RPM, or 900 RPM. Exemplary engines 10 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 8 may include one or more knock sensors 23 suitable for detecting engine "knock." The knock sensors 23 may be any sensors configured to sense sounds or vibrations caused by the engine 10, such as sound or vibration in the cylinders 26 of the engine 10 due to detonation, pre-ignition, and or pinging. The knock sensor 23 is shown communicatively coupled to an engine control unit (ECU) 25. During operations, signals from the knock sensor(s) 23 are communicated to the ECU 25 to determine if knocking conditions (e.g., pinging) exist. The ECU 25 may then adjust certain engine 10 parameters to ameliorate or eliminate the knocking conditions. For example, the ECU 25 may adjust ignition timing and/or adjust boost pressure to eliminate the knocking. As further described herein, the knock sensor 23 may additionally derive that certain sounds or vibrations should be further analyzed and categorized to detect, for example, engine conditions (e.g., pre-ignition or pinging).

Figure 2:
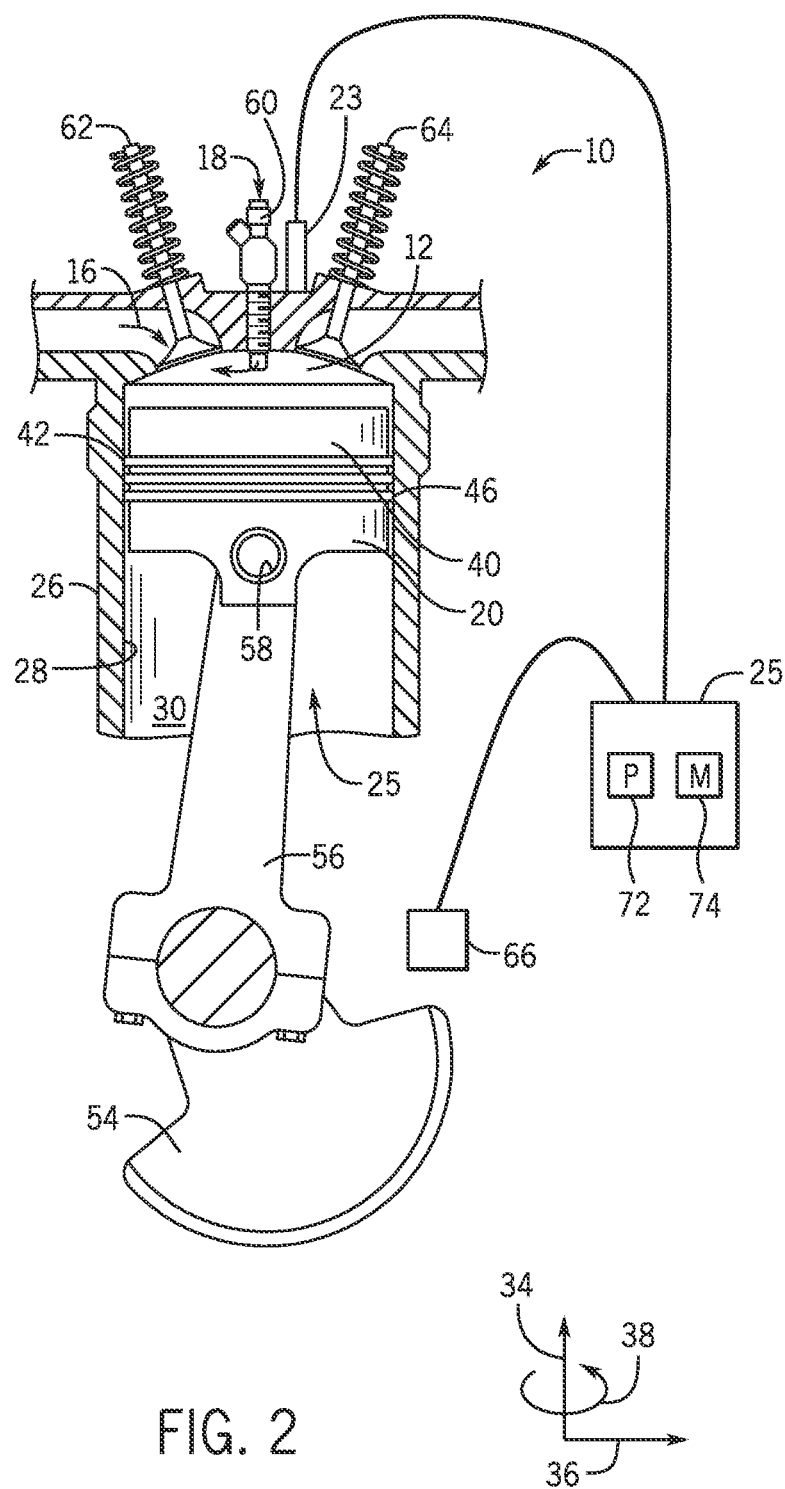
FIG. 2 is a schematic cross-sectional view of a piston and cylinder assembly of the reciprocating engine of FIG. 1 having a knock sensor, in accordance with an aspect of the present disclosure.

FIG. 2 is a side cross-sectional view of an embodiment of a piston assembly 25 having a piston 20 disposed within a cylinder 26 (e.g., an engine cylinder) of the reciprocating engine 10. The cylinder 26 has an inner annular wall 28 defining a cylindrical cavity 30 (e.g., bore). The piston 20 may be defined by an axial axis or direction 34, a radial axis or direction 36, and a circumferential axis or direction 38. The piston 20 includes a top portion 40 (e.g., a top land). The top portion 40 generally blocks the fuel 18 and the air 16, or a fuel-air mixture 32, from escaping from the combustion chamber 12 during reciprocating motion of the piston 20.

As shown, the piston 20 is attached to a crankshaft 54 via a connecting rod 56 and a pin 58. The crankshaft 54 translates the reciprocating linear motion of the piston 24 into a rotating motion. As the piston 20 moves, the crankshaft 54 rotates to power the load 24 (shown in FIG. 1), as discussed above. As shown, the combustion chamber 12 is positioned adjacent to the top land 40 of the piston 24. A fuel injector 60 provides the fuel 18 to the combustion chamber 12, and an intake valve 62 controls the delivery of air 16 to the combustion chamber 12. An exhaust valve 64 controls discharge of exhaust from the engine 10. However, it should be understood that any suitable elements and/or techniques for providing fuel 18 and air 16 to the combustion chamber 12 and/or for discharging exhaust may be utilized, and in some embodiments, no fuel injection is used. In operation, combustion of the fuel 18 with the air 16 in the combustion chamber 12 cause the piston 20 to move in a reciprocating manner (e.g., back and forth) in the axial direction 34 within the cavity 30 of the cylinder 26.

During operations, when the piston 20 is at the highest point in the cylinder 26 it is in a position called top dead center (TDC). When the piston 20 is at its lowest point in the cylinder 26, it is in a position called bottom dead center (BDC). As the piston 20 moves from top to bottom or from bottom to top, the crankshaft 54 rotates one half of a revolution. Each movement of the piston 20 from top to bottom or from bottom to top is called a stroke, and engine 10 embodiments may include two-stroke engines, three-stroke engines, four-stroke engines, five-stroke engine, six-stroke engines, or more.

During engine 10 operations, a sequence including an intake process, a compression process, a power process, and an exhaust process occurs. The intake process enables a combustible mixture, such as fuel and air, to be pulled into the cylinder 26, thus the intake valve 62 is open and the exhaust valve 64 is closed. The compression process compresses the combustible mixture into a smaller space, so both the intake valve 62 and the exhaust valve 64 are closed. The power process ignites the compressed fuel-air mixture, which may include a spark ignition through a spark plug system, and/or a compression ignition through compression heat. The resulting pressure from combustion then forces the piston 20 to BDC. The exhaust process typically returns the piston 20 to TDC while keeping the exhaust valve 64 open. The exhaust process thus expels the combusted fuel-air mixture (e.g., combustion gases) through the exhaust valve 64. It is to be noted that more than one intake valve 62 and exhaust valve 64 may be used per cylinder 26.

The depicted engine 10 also includes a crankshaft sensor 66, the knock sensor 23, and the engine control unit (ECU) 25, which includes a processor 72 and memory 74. The crankshaft sensor 66 senses the position and/or rotational speed of the crankshaft 54. Accordingly, a crank angle or crank timing information may be derived. That is, when monitoring combustion engines, timing is frequently expressed in terms of crankshaft 54 angle, which is correlative to time. For example, a full cycle of a four stroke engine 10 may be measured as a 720° cycle over a period of time. The knock sensor 23 may include one or more of a Piezo-electric accelerometer, a microelectromechanical system (MEMS) sensor, a Hall effect sensor, a magnetostrictive sensor, and/or any other sensor designed to sense vibration, acceleration, sound, and/or movement. In other embodiments, sensor 23 may not be a knock sensor in the traditional sense, but any sensor that may sense vibration, pressure, acceleration, deflection, or movement, and may not be used to detect engine "knock."

Because of the percussive nature of the engine 10, the knock sensor 23 may be capable of detecting signatures even when mounted on the exterior of the cylinder 26. However, the knock sensor(s) 23 may be disposed at various locations in or about each cylinder 26. Additionally, in some embodiments, a single knock sensor 23 may be shared, for example, with one or more adjacent cylinders 26. In other embodiments, each cylinder 26 may include one or more knock sensors 23. The crankshaft sensor 66 and the knock sensor 23 are shown in electronic communication with the engine control unit (ECU) 25. The ECU 25 includes the processor 72 and the memory 74. The memory 74 may store computer instructions that may be executed by the processor 72. The ECU 25 monitors and controls and operation of the engine 10, for example, by adjusting combustion timing, valve 62, 64, timing, adjusting the delivery of fuel and oxidant (e.g., air), and so on.

Advantageously, the techniques described herein may use the ECU 25 to receive data from the knock sensor 23. The ECU 25 may then go through the process of analyzing the data to determine operating conditions of the engine 10. For example, the ECU 25 may characterize the data received from the knock sensor 23, as described in more detail below. By providing for signature analysis, the techniques described herein may enable a more optimal and a more efficient operation and maintenance of the engine 10.

In accordance with present embodiments, the knock sensor 23, in particular, may be utilized to detect vibrations, sound, or acceleration associated with movement of the piston 20 within the cylinder 26. The profile (e.g., vibration profile, acoustic profile, or both) detected by the knock sensor 23 may be converted by the knock sensor 23 or by the ECU 25 into a parameter indicative of pressures within the cylinder 26 (e.g., including the peak firing pressure or compression ratio). The parameter indicative of pressure (e.g., including the peak firing pressure or compression ratio) may be analyzed by the ECU 25 via control logic implemented on the ECU 25 to determine peak firing pressure (e.g., the maximum pressure value in the profile), and to determine if the peak firing pressure has increased beyond a desirable amount, which may indicate pre-ignition conditions, as explained above, or may indicate (e.g., predict) that the engine 10 is approaching pre-ignition conditions. It should be noted that the description of vibration herein is intended to also cover acoustic measurements, light measurements, acceleration measurements, or a combination thereof, or any other suitable measurement(s).

Figure 3:
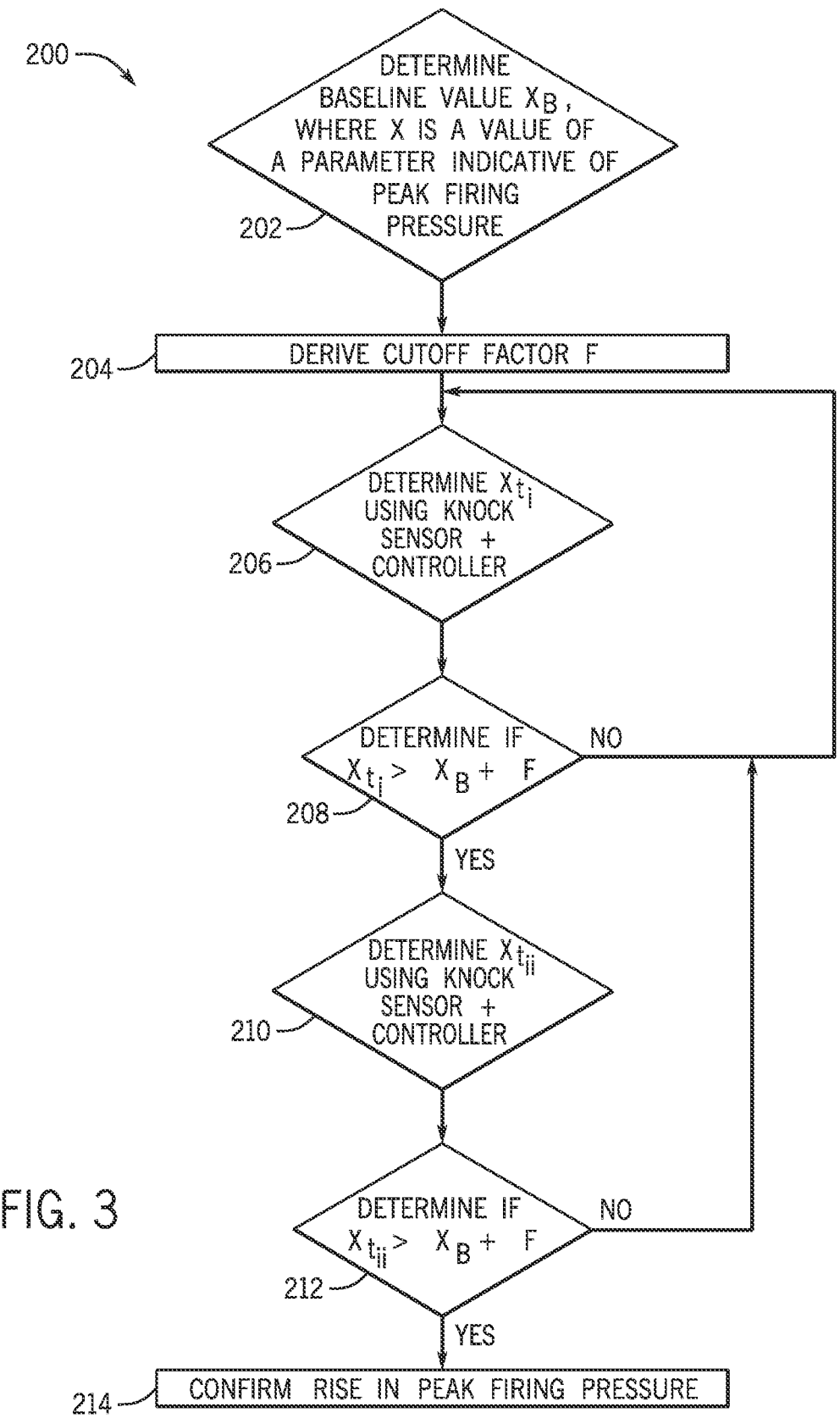
FIG. 3 is a flow diagram of an embodiment of a process suitable for detecting a rise in peak firing pressure in the reciprocating engine of FIG. 1, in accordance with an aspect of the present disclosure.

For example, a flow diagram of an embodiment of a process 200 suitable for detecting a change (e.g., a rise) in peak firing pressure in the reciprocating engine 10 is shown in FIG. 3. The process 200 may be implemented as computer code or executable instructions stored in the memory 74 and executable via the processor 72. In the illustrated embodiment, the process 200 includes determining a baseline value $X_b$, where X is a value of a parameter indicative of peak firing pressure (block 202). The baseline value $X_b$ of the parameter indicative of peak firing pressure may be determined from data received from the knock sensor 23 (and in some embodiments, only from data received from the knock sensor 23), and may be associated with any of the following: 1) a position of the piston 20 within the cylinder 26; 2) a speed of the piston 20 within the cylinder 26; 3) an acceleration of the piston 20 within the cylinder 26; 4) a pressure within the cylinder 26; or 5) a combination thereof. Further, the baseline value $X_b$ may be measured (e.g., detected, deduced, determined, or estimated) at a particular moment in time when the engine 10 is operating, e.g., at the time the ignition mechanism (e.g., spark plug) ignites the fuel-air mixture to generate the hot combustion gases. Alternatively, the baseline value $X_b$ may be a maximum value detected over a period of time (e.g., over one stroke of the piston 20 within the cylinder 26), or deduced from values detected over the period of time (e.g., by determining the maximum value). For example, in some embodiments, $X_b$ may be determined by analyzing only the data provided by the knock sensor 23 (e.g., vibrations or sound within the cylinder 26).

The baseline value $X_b$ is generally deduced by the ECU 25 from a vibrational profile measured by the knock sensor 23 (where the vibrations correspond with, e.g., pressures in the cylinder 26), as described below. For example, the knock sensor 23 detects vibrations in the cylinder 26 and communicates the vibrations to the ECU 25 via a signal for processing. The vibrations may be indicative of a range of various pressures (or of parameters related to pressure) within the cylinder 26, and the knock sensor 23 may detect the vibrations indicative of the range of various pressures (or parameters related to pressure) over, for example, a period of time The ECU 25 may evaluate the range of pressures (or the range of the parameter related to pressure) to determine peak firing pressure (e.g., the highest pressure). In other words, in some embodiments, the ECU 25 may determine the peak firing pressure (or parameter indicative of peak firing pressure) by analyzing only data received from the knock sensor 23 (e.g., without analyzing data received from the crankshaft sensor 66).

The knock sensor 23 may detect the vibrations during a baselining process in a factory (e.g., before the engine 10 is operating in normal conditions), thereby enabling the baseline value $X_b$ to reflect factory performance (e.g., ideal performance) of the engine 10. After receiving the signal from the knock sensor 23 (e.g., the signal indicative of the vibrations detected by the knock sensor 23), the ECU 25 may process the signal to deduce the baseline value $X_b$ of the parameter indicative of peak firing pressure (e.g., in accordance with the description above) from the vibrations detected by the knock sensor 23 and transmitted, via the signal, to the ECU 25. It should be noted, however, that the knock sensor 23, in some embodiments, may deduce and convert the detected vibrations to the baseline value $X_b$ directly, and communicate the baseline value $X_b$ to the ECU 25, via a signal, for further processing.

In either embodiment, the process 200 also includes deriving a cutoff factor F of the parameter indicative of peak firing pressure (block 204). The cutoff factor F an added value added to the baseline value $X_b$ of the parameter indicative of peak firing pressure to derive an appropriate range of operating peak firing pressures that the engine 10 may experience under normal conditions. In some embodiments, the cutoff factor F may be a multiplier (e.g., $1.01X_b$, $1.1X_b$, $1.2X_b$, $1.3X_b$, and so on and so forth). Generally, the operating peak firing pressure of an operating cylinder 26 or cylinders 26 of the engine 10 may fluctuate slightly (e.g., within the cutoff factor F) over time due to a number of different factors. For example, external temperature may affect operating conditions of the engine 10 and, thus, may affect the operating peak firing pressure within the cylinder 26 of the engine 10. Additionally, the peak firing pressure may fluctuate slightly as a normal (e.g., small) amount of oil or other contaminants have created coke or other deposits on the inside of the cylinder 26. However, if operating peak firing pressure exceeds the baseline value $X_b$ plus the cutoff factor F, the engine 10 may be operating with excess peak firing pressure, indicating that operating conditions are not ideal (e.g., abnormal or large amounts of oil or other contaminants have created undesired coating on the inside of the cylinder 26). Operating peak firing pressures exceeding a baseline peak firing pressure plus a cutoff factor of the baseline peak firing pressure may reduce an efficiency of the engine 10, and may indicate that pre-ignition conditions are occurring or about to occur.

To determine if operating peak firing pressures are too high (e.g., outside the appropriate range), the ECU 25 may instruct the knock sensor 23 to measure (e.g., detect) vibrations of the cylinder 26 during operation of the engine 10. The knock sensor 23 may transmit the vibrational profile to the ECU 25 via one or more signals, as previously described, and the ECU 25 may deduce from the signal(s) a first operating value $X_{ti}$ of the parameter indicative of peak firing pressure at time $t_i$ (block 206). In some embodiments, as previously described, the knock sensor 23 directly converts the vibration measurements taken by the knock sensor 23 and deduces the first operating value $X_{ti}$ of the parameter indicative of peak firing pressure, and communicates the first operating value $X_{ti}$ to the ECU 25 via a signal.

The ECU 25 then compares the first operating value $X_{ti}$ with the baseline value $X_b$ and the cutoff factor F to determine if a change (e.g., a rise or fall) in peak firing pressure has occurred (block 208). For example, if the ECU 25 determines that the first operating value $X_{ti}$ of the parameter indicative of peak firing pressure is less than the baseline value $X_b$ of the parameter indicative of peak firing pressure plus the cutoff factor F, the peak firing pressure has not risen beyond the appropriate range (e.g., defined by the cutoff factor F) and the process 200 repeats starting with block 206.

However, if the ECU 25 determines that the first operating value $X_{ti}$ of the parameter indicative of peak firing pressure is greater than the baseline value $X_b$ of the parameter indicative of peak firing pressure plus the cutoff factor F, a substantial rise in peak firing pressure has been detected in the cylinder 26. To confirm the increase in peak firing pressure, the process 200 includes determining a second operating value $X_{tii}$ of the parameter indicative of peak firing pressure using the knock sensor 23 at time $t_{ii}$ (block 210). For example, the ECU 25 instructs the knock sensor 23 to detect or measure vibrations of the piston 20 and/or cylinder 26. The second measurement (e.g., vibrational profile) by the knock sensor 23 is derived (e.g., via conversion from the vibration profile to the second operative value $X_{tii}$) in the same manner as the first measurement, but after the first measurement. The ECU 25 then compares the second operating value $X_{tii}$ with the baseline value $X_b$ plus the cutoff factor F (block 212). For example, the ECU 25 determines if the second operating value $X_{tii}$ of the parameter indicative of peak firing pressure is less than or greater than the baseline value $X_b$ plus the cutoff factor F. If the second operating value $X_{tii}$ is greater than the baseline value $X_b$ plus the cutoff factor F, the rise in peak firing pressure in the cylinder 26 is confirmed (block 214). Once the rise in peak firing pressure is confirmed in accordance with the above description, the engine 10 may automatically shut off, the offending cylinder 26 of the engine 10 may be shut off, or the ECU 25 may indicate the rise in peak firing pressure to an operator. For example, the ECU 25 may instruct a light, a sound, a gauge, or some other signal to activate upon confirmation of the rise in peak firing pressure.

In some embodiments, it may be beneficial to use other control logic implemented on the ECU 25, based on the same measurements described in the process 200, to determine rises in peak firing pressure during operation of the engine 10. For example, a process flow diagram of an embodiment of a process 300 suitable for detecting incremental rises in peak firing pressure in the reciprocating engine 10 is shown in FIG. 4.

Figure 4:
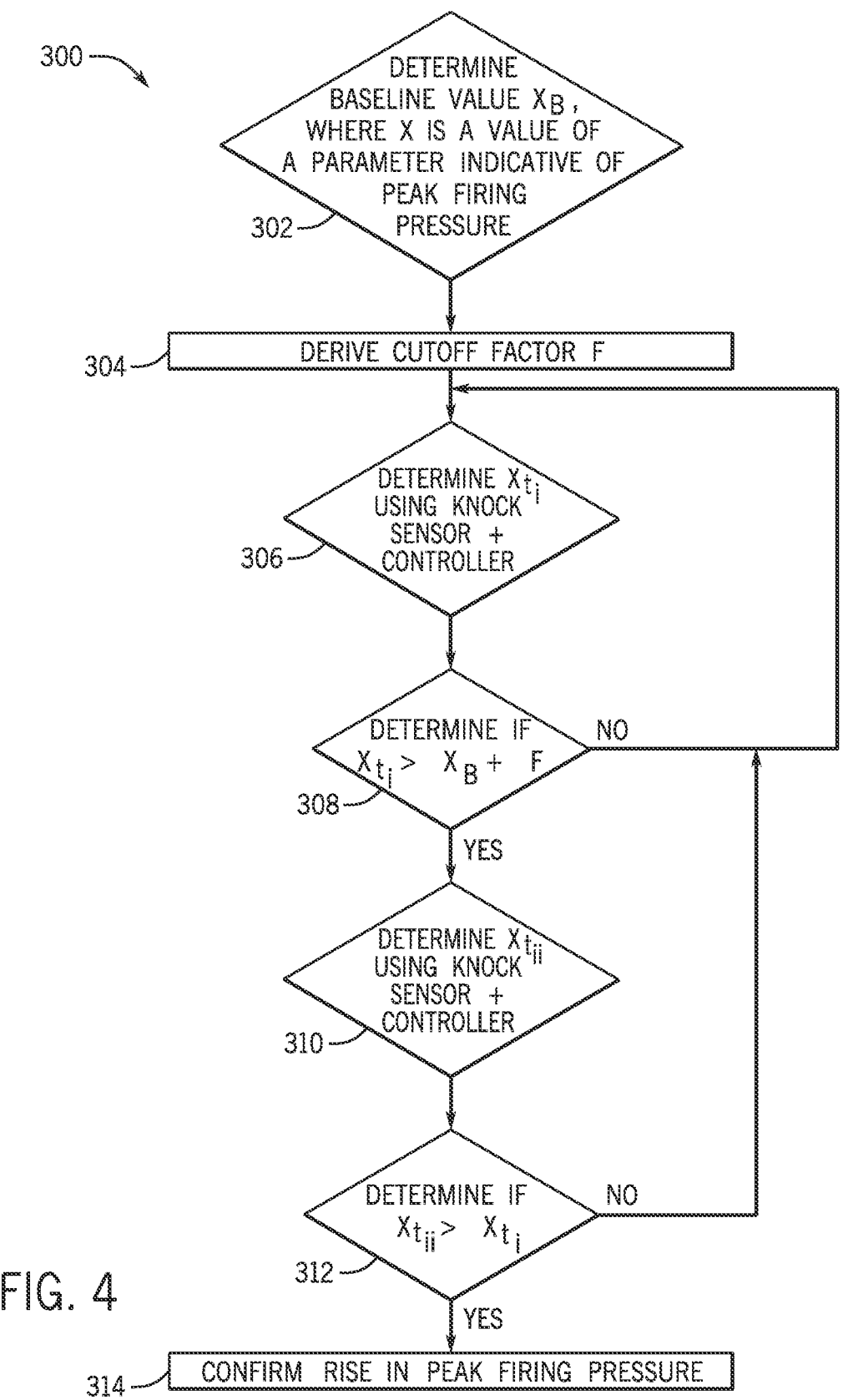
FIG. 4 is a flow diagram of an embodiment of a process suitable for detecting incremental rises in peak firing pressure in the reciprocating engine of FIG. 1, in accordance with an aspect of the present disclosure.

In the illustrated embodiment of FIG. 4, blocks 302, 304, 306, 308, and 310 of the process 300 may correspond with blocks 202, 204, 206, 208, and 210 of the process 200 of FIG. 3 described above. The process 300 may be implemented as computer code or executable instructions stored in the memory 74 and executable via the processor 72. For example, if the first operating value $X_{ti}$ of the parameter indicative of peak firing pressure detected by the knock sensor 23 at time $t_i$ (e.g., directly or indirectly detected, as set forth above) is greater than the baseline value $X_b$ plus the cutoff factor F (e.g., as determined by the ECU 25), the second operating value $X_{tii}$ of the parameter indicative of peak firing pressure is detected at time $t_{ii}$ and deduced by the knock sensor 23 and the ECU 25 (e.g., directly or indirectly detected, as set forth above). However, in the process 300 of FIG. 4, the second operating value $X_{tii}$ is compared, via the ECU 25, directly with the first operating value $X_{ti}$ (block 312). If the second operating value $X_{tii}$ is greater than the first operating value $X_{ti}$, the rise in peak firing pressure is confirmed (block 314). Further, the rise in peak firing pressure may be considered an incremental rise (e.g., a series of rises), in that the first operating value $X_{ti}$ indicated a rise over the baseline value $X_b$ plus cutoff factor F, and the second operating value $X_{tii}$ indicates a rise over even the first operating value $X_{ti}$. Incremental rises (e.g., rises in a series) may indicate that the peak firing pressure is rising quickly and/or consistently. Accordingly, the engine 10 may be shutoff (e.g., by the ECU 25), one or more cylinders 26 of the engine 10 may be shut off (e.g., by the ECU 25), the ECU 25 may initiate a corrective action to remedy the change (e.g., rise) in peak firing pressure, and/or the ECU 25 may indicate the quick and/or consistent rise in peak firing pressure to the operator. For a series of incremental rises in peak firing pressure, the response by the engine 10 may, in some embodiments, be more substantial (e.g., engine shut down) than detecting and confirming a single rise in peak firing pressure as described with reference to process 200.

Figure 5:
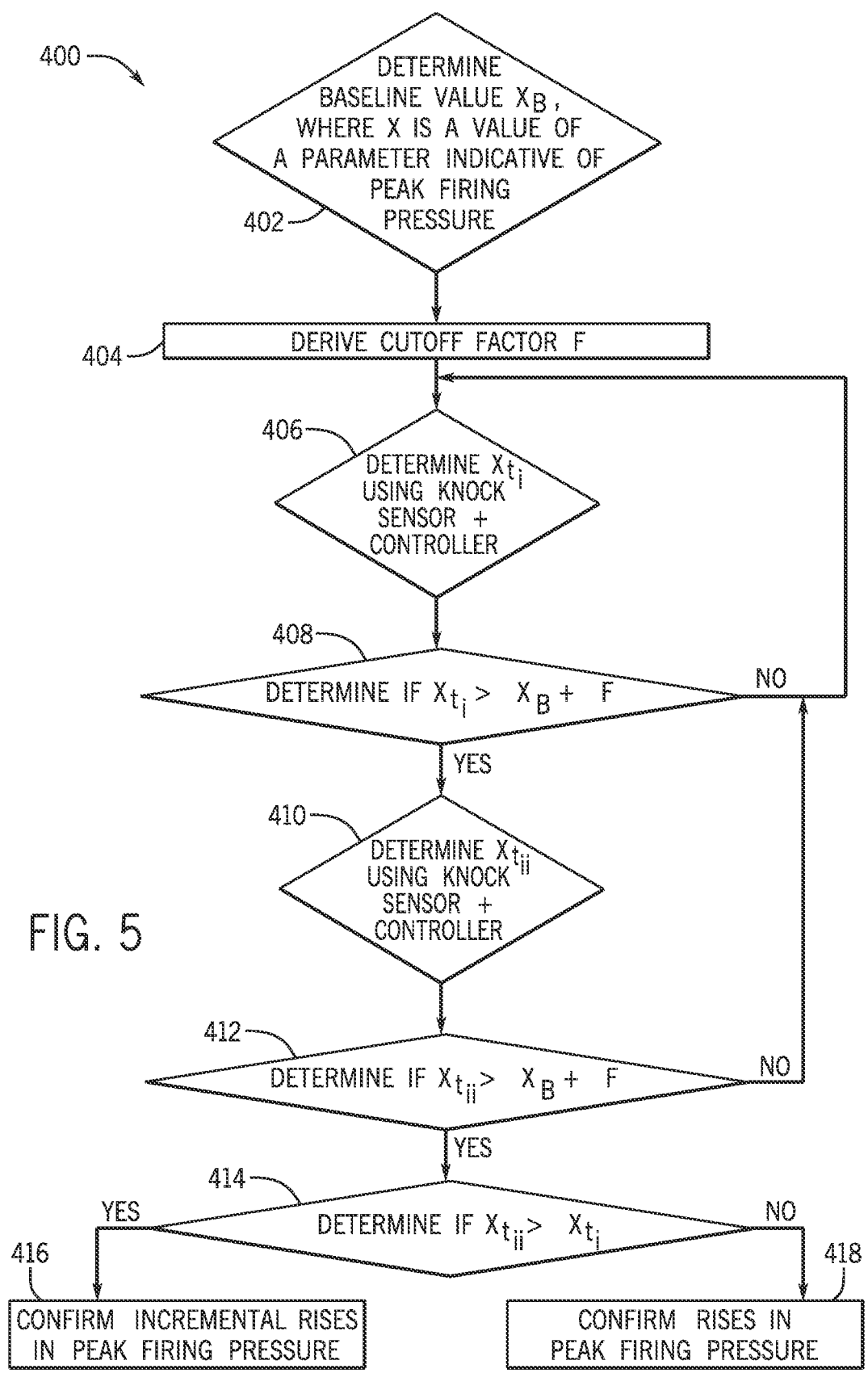
FIG. 5 is a flow diagram of an embodiment of a process suitable for detecting a rise, incremental rises, or both in peak firing pressure in the reciprocating engine of FIG. 1, in accordance with an aspect of the present disclosure.

In still further embodiments, it may be beneficial to combine various control logic implemented on the ECU 25 and described above for robust detection of rises or changes in peak firing pressure. In other words, it may be beneficial to confirm that the peak firing pressure has risen above the cutoff threshold (e.g., as defined by the baseline value and the cutoff factor F) via a comparison of the cutoff threshold with multiple data points measures (e.g., detected) by the knock sensor, in addition to comparing the multiple data points (e.g., $X_{ti}$ and $X_{tii}$) with each other. For example, a process flow diagram of an embodiment of a process 400 of confirming an increase in peak firing pressure in addition to detecting incremental rises in peak firing pressure is shown in FIG. 5.

In the illustrated embodiment, blocks 402, 404, 406, 408, 410, and 412 may correspond with blocks 202, 204, 206, 208, 210, and 212 of the process 200 of FIG. 3 described above. Further, block 414 may correspond with block 312 in the process 300 of FIG. 4. For example, process 400 may correspond with process 200 through blocks 212 and 412, respectively. The process 400 may be implemented as computer code or executable instructions stored in the memory 74 and executable via the processor 72.

After the ECU 25 (e.g., controller) confirms that the peak firing pressure has risen by comparing the second operating value $X_{tii}$ with the baseline value $X_B$ plus the cutoff factor F (block 412), a range of pressures including the second operating value $X_{tii}$ is detected (via vibration detection by the knock sensor 23), deduced (via conversion of the vibration to the second operating value $X_{tii}$ of the parameter indicative of peak firing pressure), and compared with the first operating value $X_{ti}$, as described with reference to process 300 (block 414). If the second operating value $X_{tii}$ exceeds the first operating value $X_{ti}$, an incremental rise (e.g., a series of rises) is confirmed (block 416). If the second operating value $X_{tii}$ does not exceed the first operating value $X_{ti}$, the incremental rise or series of rises is not confirmed, but the rise in peak firing over the baseline value $X_B$ plus cutoff factor F (e.g., from block 412) is confirmed (block 418). As previously described, the response of the engine 10 to the two conditions in blocks 416 and 418 may be different. For example, if the peak firing pressure has risen incrementally or in a series, as described in block 416, the engine 10 may shut down, a remedial control action may be initiated by the ECU 25, or the ECU 25 may alert an operator with a first indicator (e.g., viewable gauge, lights, audible horn, and so on). If the peak firing pressure has not rise incrementally or in a series, but has been confirmed above the baseline value $X_B$ plus cutoff factor F, as described in block 418, the engine 10 may alert the operator with a second indicator that indicates a less substantial problem than the first indicator.

Figure 6:
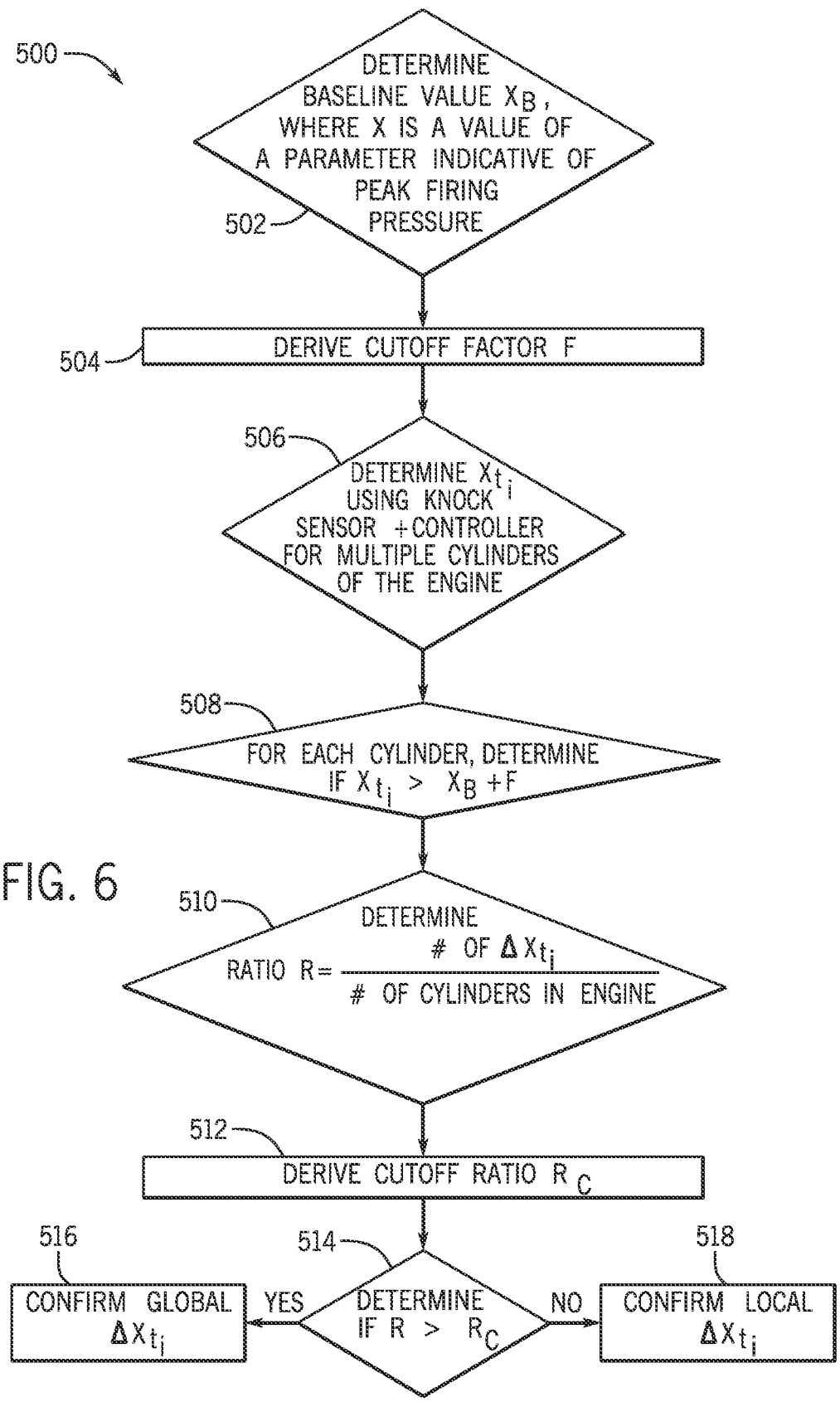
FIG. 6 is a flow diagram of an embodiment of a process suitable for detecting a local or global rise in peak firing pressure across one or more cylinders of the reciprocating engine of FIG. 1, in accordance with an aspect of the present disclosure.

In still other embodiments, it may be beneficial to compare results, via the ECU 25, of multiple cylinders 26 across the engine 10. Comparing the results may be beneficial, e.g., in determining causes of a change (e.g., rise) in peak firing pressure. For example, a flow diagram of an embodiment of a process 500 suitable for detecting a local or global rise in peak firing pressure across one or more cylinders 26 of the reciprocating engine 10 of FIG. 1 is shown in FIG. 6. In the illustrated embodiment, blocks 502 and 504 correspond with blocks 202 and 204 in FIG. 3. The process 500 also includes determining the operating value $X_{ti}$ at a first time $t_i$ using knock sensors 23 for each cylinder 26 of the engine 10 (e.g., where the engine 10 includes multiple cylinders 26), in accordance with the descriptions above (block 506). Each operating value $X_{ti}$ may be stored in an array of operating values $X_{ti}$ for the specified time $t_i$. The process 500 also includes determining, for each cylinder 26, if $X_{ti}$ is greater than the baseline value $X_B$ plus the cutoff factor F (block 508) to determine a change (e.g., rise) in peak firing pressure. A separate array may be generated indicating which cylinders 26 included changes (e.g. rises) over the baseline value $X_B$. Although not shown in the illustrated embodiment, it should be noted that second operating values $X_{tii}$ may be determined in accordance with previous descriptions to confirm the change (e.g., rise) in peak firing pressures.

After changes (e.g., rises) in peak firing pressure are determined or confirmed for various ones of the cylinders 26 of the engine 10, the ECU 25 may determine a ratio R of the total number of changes (e.g., rises) in peak firing pressure across the plurality of cylinders 26 (or, put differently, the total number of cylinders 26 in which changes [e.g., rises] in peak firing pressure were detected or confirmed) divided by the total number of cylinders 26 in the engine 10 (or the total number of cylinders 26 tested via the process 500) (block 510). A cutoff ratio $R_c$ may also be derived (e.g, by the ECU 25) (block 512). The ratio R may be compared with the cutoff ratio $R_c$ to determine if the ratio R is larger than or smaller than the cutoff ratio $R_c$ (block 514).

If the ratio R is larger than the cutoff ratio $R_c$, the ECU 25 may confirm that the change(s) (e.g., rise(s)) in peak firing pressure(s) are a global concern of the engine 10 (block 516). If the ratio R is not larger than (e.g., equal to or less than) the ratio cutoff $R_c$, the ECU 25 may confirm that the change(s) (e.g., rise(s)) in peak firing pressure(s) are a local concern of the offending cylinders 26 (block 518). For example, a global concern may indicate that a condition affecting all (or a larger enough number) of the cylinders 26 may be causing the rises in peak firing pressure. Global concerns may include, but are not limited to, problems with a fuel being supplied to the cylinders 26. A local concern may indicate that a condition affecting one or a small subset of the cylinders 26 may be causing the rises in peak firing pressure. Local concerns may include, but are not limited to, defects in the offending cylinder(s) 26. The ECU 25 may employ different responses to local and global concerns. For example, the ECU 25 may shut off the entire engine 10 if a global concern is detected, but may only alert an operator if local concerns are detected.

In general, systems and methods in accordance with the present disclosure detect changes (e.g., rises) in peak firing pressure (or compression ratio) of a reciprocating engine to determine if the engine is approaching or has reached pre-ignition (e.g., engine knocking) conditions. The systems and methods utilize detection of vibrations of a cylinder of the engine or of a piston with the cylinder, conversion of the vibration profiles (e.g., graphs) to one or more values indicative of peak firing pressure, and comparison of the values with each other or with a baseline value to determine rises in peak firing pressure (or compression ratio). By implementing various control logic on a controller (e.g., engine control unit (ECU)) and utilizing the control logic to compare the various values detected by the knock sensor, pre-ignition conditions or potential pre-ignition conditions can be communicated to an operator, such that the operator may intervene and remedy the problem.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A reciprocating engine system, comprising:
   a cylinder;
   a piston disposed within the cylinder;
   a knock sensor disposed external to the cylinder and configured to detect vibrations of the cylinder, the piston, or both that correspond with varying pressures within the cylinder; and
   a controller communicatively coupled to the knock sensor and configured to receive a first signal from the knock sensor corresponding with first vibrations of the cylinder and to deduce from the first signal a first operating value of a parameter indicative of peak firing pressure at a first point in time, to compare the first operating value with a baseline value of the parameter indicative of peak firing pressure to detect a change in peak firing pressure based on the first operating value diverging from the baseline value, to receive a second signal from the knock sensor corresponding with second vibrations of the cylinder and to deduce from the second signal a second operating value of the parameter indicative of peak firing pressure at a second point in time, to compare the second operating value with the baseline value to confirm the change in peak firing pressure based on the first operating value and the second operating value diverging from the baseline value, and to output a signal, based on the confirmation of the change in peak firing pressure, indicative of a control command to a component of the reciprocating engine system or indicative of an alert to an operator.

2. The system of claim 1, wherein the controller is configured to determine if the first operating value is greater than the baseline value plus a cutoff factor of the parameter indicative of peak firing pressure to detect a rise in peak firing pressure, and wherein the controller is configured to determine if the second operating value is greater than the baseline value plus the cutoff factor to confirm the rise in peak firing pressure.

3. The system of claim 1, wherein the parameter indicative of peak firing pressure comprises a position of the piston within the cylinder, a speed of the piston within the cylinder, an acceleration of the piston within the cylinder, a pressure of a combustion chamber proximate to or within the cylinder, or a combination thereof.

4. The system of claim 1, wherein the knock sensor is configured to detect a first vibrational profile and a second vibration profile corresponding to the first and second signals, and the controller is configured to analyze the first and second vibration profiles to determine the first and second operating values.

5. The system of claim 1, wherein the system is configured to activate a gauge, a light, an audible sound, or a combination thereof in response to the signal indicative of an alert to an operator.

6. The system of claim 1, wherein the baseline value comprises a vibration profile derived as a noise level as a function of time, a noise frequency, a noise phase, a noise amplitude, or a combination thereof.

7. The system of claim 1, wherein the controller is configured to instruct the reciprocating engine system to shut off, or an offending cylinder of the reciprocating engine system to shut off, in response to the signal indicative of the control command.

8. The system of claim 1, wherein the knock sensor is mounted to the reciprocating engine system.

9. A method, comprising:
   detecting, via a plurality of knock sensors disposed external to a corresponding plurality of cylinders, a first plurality of vibrational profiles of the corresponding plurality of cylinders over a first combustion cycle, and a second plurality of vibrational profiles of the corresponding plurality of cylinders over a second combustion cycle, wherein the first and second plurality of vibrational profiles are indicative of a corresponding first and second plurality of pressures within the corresponding plurality of cylinders over the first and second combustion cycles, respectively;
   receiving, via a controller, a first plurality of signals and a second plurality of signals from the plurality of knock sensors that correspond with the first and second plurality of vibrational profiles, respectively;
   determining, via the controller, a first operating value of a parameter indicative of peak firing pressure from the first plurality of signals, and a second operating value of the parameter indicative of peak firing pressure from the second plurality of signals;
   comparing, via the controller, the first operating value with a baseline value of the parameter indicative of peak firing pressure to determine a change in peak firing pressure in one or more cylinders of the corresponding plurality of cylinders based on the first operating value diverging from the baseline value;

in response to determining the change in peak firing pressure in the one or more cylinders, comparing, via the controller, the second operating value with the baseline value of the parameter indicative of peak firing pressure to confirm the change in peak firing pressure in the one or more cylinders of the corresponding plurality of cylinders based on the first operating value and the second operating value diverging from the baseline value; and outputting a signal, based on the confirmation of the change in peak firing pressure, indicative of a control command to a component of the reciprocating engine system or indicative of an alert to an operator.

10. The method of claim 9, comprising:
determining, via the controller, either a local change in peak firing pressure or a global change in peak firing pressure in the one or more cylinders of the plurality of cylinders of the reciprocating engine.

11. The method of claim 10, wherein determining either the local change in peak firing pressure or the global change in peak firing pressure comprises:
determining a total number of the one or more cylinders that include the change in peak firing pressure;
determining a ratio between the total number of the one or more cylinders that include the confirmation of the change in peak firing pressure and a total number of the corresponding plurality of cylinders; and
determining whether the ratio exceeds a cutoff ratio;
wherein the global change in peak firing pressure is determined by the ratio being greater than the cutoff ratio and the local change in peak firing pressure is indicated by the ratio being less than or equal to the cutoff ratio.

12. The method of claim 9, wherein the parameter indicative of peak firing pressure comprises a position of a piston within a cylinder of the corresponding plurality of cylinders, a speed of the piston within the cylinder, an acceleration of the piston within the cylinder, a pressure of a combustion chamber proximate to or within the cylinder, or a combination thereof.

13. The method of claim 11, wherein the baseline value and/or the cutoff ratio is an input to the controller, and one or both of the baseline value and cutoff ratio is based on a factory derived baseline of the reciprocating engine system.

14. The method of claim 13, wherein the factory derived baseline comprises a vibration profile derived as a noise level as a function of time, a noise frequency, a noise phase, a noise amplitude, or a combination thereof.

15. The method of claim 9, comprising:
comparing, via the controller, the first operating value with the baseline value of the parameter indicative of peak firing pressure to determine a lack of change in peak firing pressure in the one or more cylinders of the corresponding plurality of cylinders based on the first operating value not diverging from the baseline value; and in response to determining the lack of change in peak firing pressure in the one or more cylinders, comparing, via the controller, the first operating value with the baseline value of the parameter indicative of peak firing pressure to determine the change in peak firing pressure in the one or more cylinders of the corresponding plurality of cylinders based on the first operating value diverging from the baseline value.

16. A non-transitory computer readable medium comprising executable instructions that, when executed, cause a processor to:
receive, from a knock sensor at a first time, a first signal indicative of first vibrations within a cylinder that correspond with a first range of pressures within the cylinder, wherein the knock sensor is disposed external to the cylinder;
receive, via the knock sensor at a second time, a second signal indicative of second vibrations within the cylinder that correspond with a second range of pressures within the cylinder;
deduce, from the first and second signals, a first value of a parameter indicative of peak firing pressure from the first signal and a second value of the parameter indicative of peak firing pressure from the second signal, respectively;
compare the first value with a baseline value of a parameter indicative of peak firing pressure to determine a change in peak firing pressure in the cylinder based on the first value diverging from the baseline value;
compare the second value with the baseline value to confirm the change in peak firing pressure based on the first and second values diverging from the baseline value; and
output a signal, based on the confirmation of the change in peak firing pressure, indicative of a control command to a component of the reciprocating engine system or indicative of an alert to an operator.

17. The non-transitory computer readable medium comprising executable instructions of claim 16, wherein the instructions cause the processor to:
derive a cutoff factor of the parameter corresponding to peak firing pressure; and
determine if the second value is greater than the baseline value plus the cutoff factor of the parameter corresponding to peak firing pressure to detect the rise in peak firing pressure.

18. The non-transitory computer readable medium comprising executable instructions of claim 16, wherein the parameter corresponding to peak firing pressure is a pressure within the cylinder, a position of a piston within the cylinder, a speed of the piston within the cylinder, an acceleration of the piston within the cylinder, or a combination thereof.

19. The non-transitory computer readable medium comprising executable instructions of claim 16, wherein the instructions cause the processor to:
receive, from the knock sensor, a third signal indicative of a third value of the parameter corresponding to peak firing pressure at a third point in time; and
compare the third value with the second value to detect an incremental rise or a series of rises in peak firing pressure.

20. The non-transitory computer readable medium comprising executable instructions of claim 16, wherein instructions cause the processor to cause a gauge, a light, an audible sound, or a combination thereof to activate in response to the signal indicative of an alert to an operator.

* * * * *